United States Patent
Purdy et al.

[15] 3,680,684
[45] Aug. 1, 1972

[54] METHOD AND APPARATUS FOR CLEANING CONVEYOR BELTS

[72] Inventors: Richard A. Purdy, Salida; Thomas F. Rutledge, Leadville, both of Colo.

[73] Assignee: American Metal Climax, Inc., New York, N.Y.

[22] Filed: Feb. 25, 1971

[21] Appl. No.: 118,629

[52] U.S. Cl. ............................................. 198/230
[51] Int. Cl. ............................................. B65g 45/00
[58] Field of Search ....................... 198/230, 229

[56] References Cited

UNITED STATES PATENTS

| | | | |
|---|---|---|---|
| 263,634 | 8/1882 | Webster | 198/229 X |
| 1,255,977 | 2/1918 | Bemis | 198/230 |
| 3,592,329 | 7/1971 | Floishauer | 198/230 X |

FOREIGN PATENTS OR APPLICATIONS 900,060   7/1962   Great Britain ................ 198/230

Primary Examiner—Richard E. Aegerter
Assistant Examiner—Douglas D. Watts
Attorney—Kasper T. Serijan and Eugene J. Kalil

[57] ABSTRACT

A method and apparatus for removing particulate matter retained by a conveyor belt includes a belt-cleaning station disposed transverse to the belt width. The cleaning equipment comprises plural orifices for directing a stream of compressed air across the width of the belt to dislodge the retained particles, and nested communicating conduits through which suction is applied for capturing and removing the particles dislodged from the belt.

7 Claims, 4 Drawing Figures

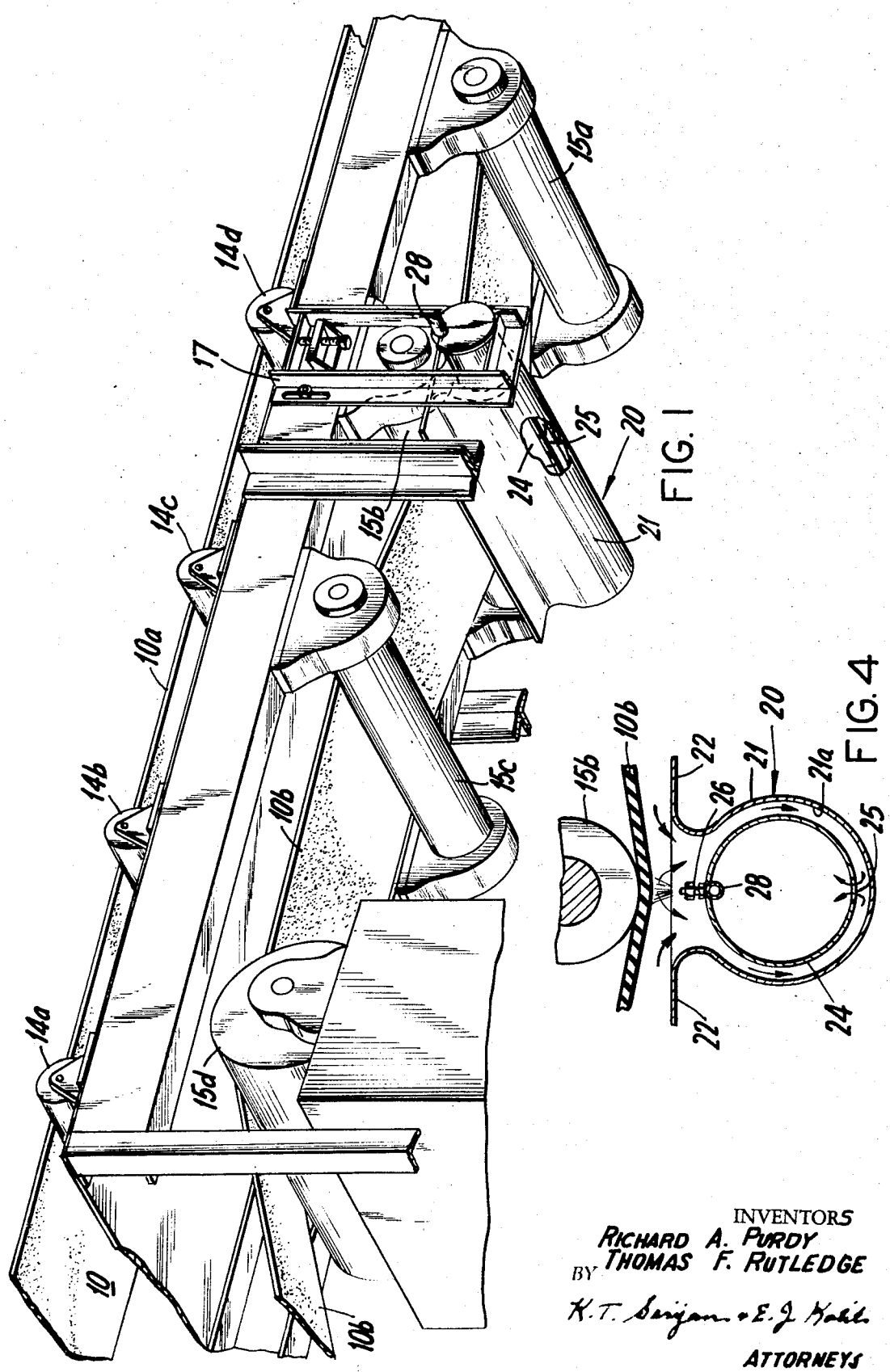

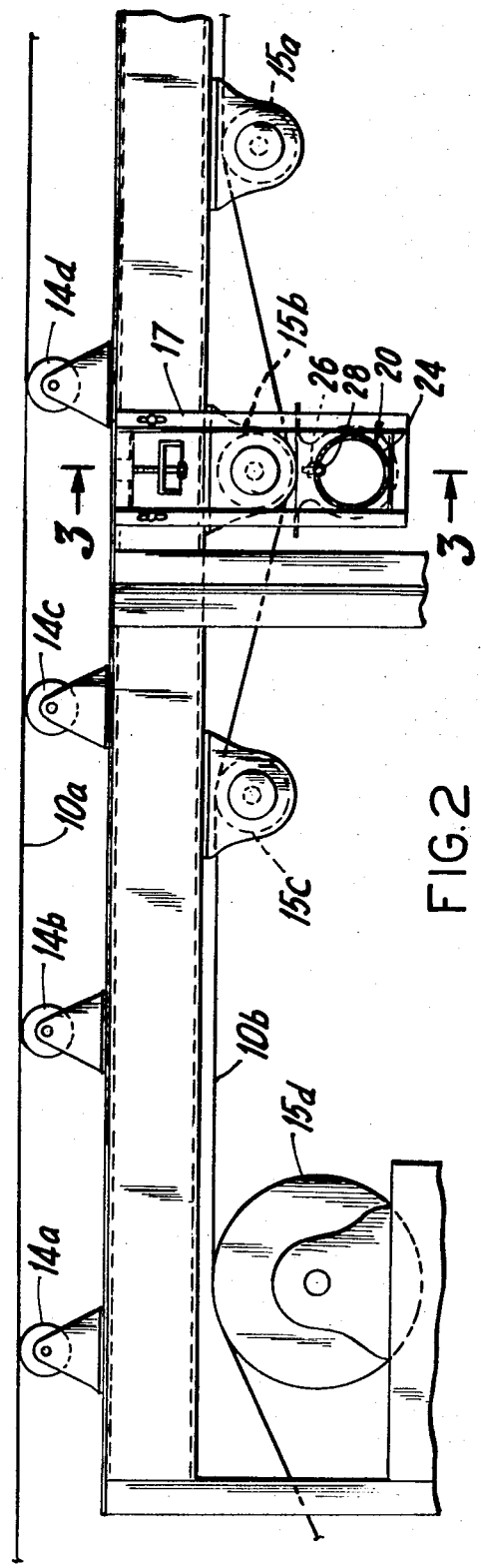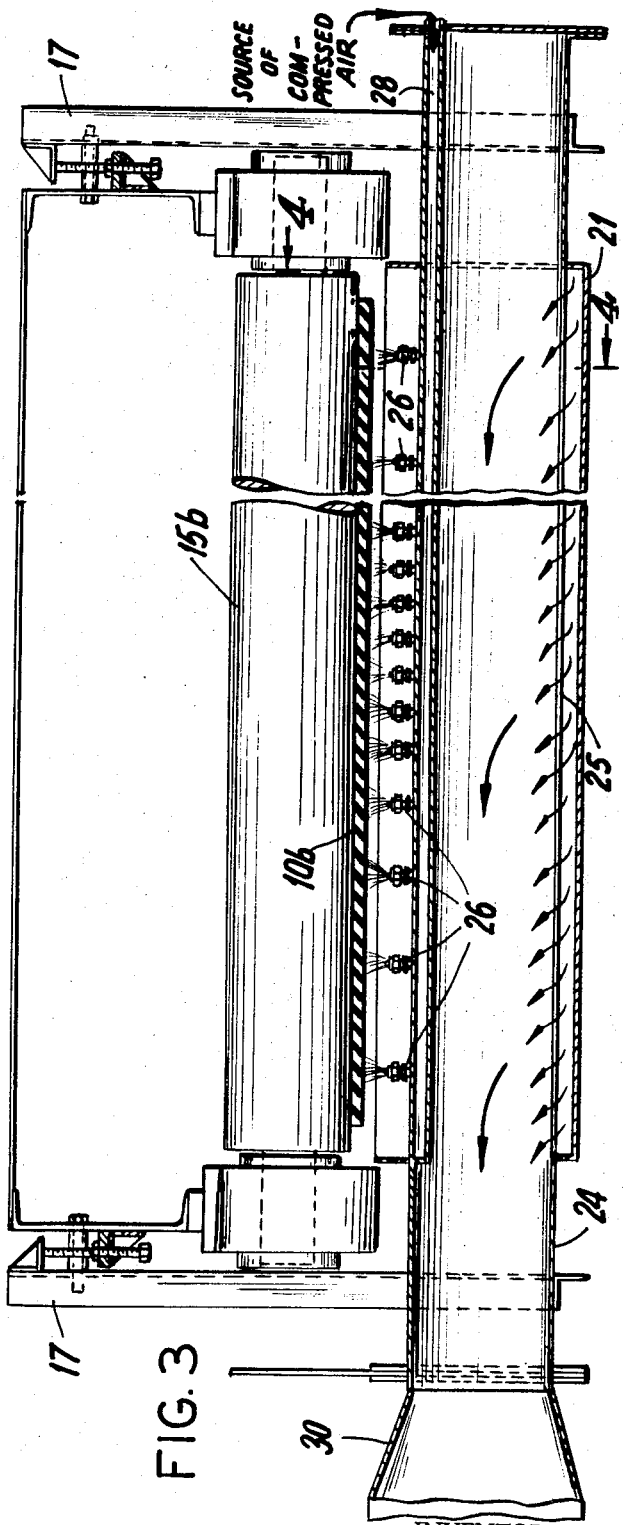

METHOD AND APPARATUS FOR CLEANING CONVEYOR BELTS

This invention relates to conveyor apparatus and, more specifically, to an improved method and structure for cleaning conveyor belts and the like.

Various physical mechanisms have heretofore been employed to remove small particulate matter, e.g., of submicron size, retained by conveyor belt apparatus. Depending upon the particular conveyance application, recovery of the removed material may or may not be of commercial importance.

Thus, for example, rotary brushes or a scraper member have engaged the belt at a cleaning station operatively following removal of the subject material carried by the conveyor, e.g., a mineral ore to be processed. However, these cleaning techniques often fail to remove small particles from belt interstices. This material subsequently becomes dislodged, as at flexing engagement of the belt with idler rollers, and becomes airborne. If electrostatically charged, these dislodged particles may remain suspended. Moreover, the larger particles removed by the brushes or scrapers are propelled into the atmosphere, thereby presenting air pollution difficulties to employees working about the conveyor apparatus.

Water sprays have also heretofore been employed to dislodge particles from conveyors. However, water cleaning creates a sludge mass which fouls pipes and the like. Further, and in any event, water cannot be tolerated for some conveyor applications.

It is thus an object of the present invention to provide an improved method and apparatus for removing particles from conveyor apparatus.

More specifically, it is an object of the present invention to provide a method and apparatus for dislodging and capturing material retained by conveyor apparatus at a conveyor cleaning station.

The above and other objects of the present invention are realized in specific, illustrative conveyor cleaning apparatus including an endless driven conveyor belt for conveying a subject material, e.g., mineral ore, from an input source station to an ore delivery station. The belt moves past the delivery station to a cleaning station where it passes in close proximity to the belt-cleaning apparatus. The cleaning apparatus is disposed transverse to the conveyor belt, and includes plural nozzle orifices for directing compressed air streams against the conveyor belt surface to dislodge particles secured thereto. The air nozzles are secured on the inner of two nested communicating cylinders spaced relative to each other to provide an annular chamber therebetween through which suction is applied. Accordingly, particles dislodged from the belt are removed by suction between the cylinders and into the interior unit for end collection.

The above and other features and advantages of the present invention will become more clearly apparent from the following detailed description of an illustrative embodiment thereof presented hereinbelow in conjunction with the accompanying drawing, in which:

FIG. 1 is an isometric view of conveyor belt and belt-cleaning apparatus illustrating the principles of the present invention;

FIG. 2 is an elevation view of the FIG. 1 apparatus;

FIG. 3 is a cross sectional view taken at section 3—3 in FIG. 2; and

FIG. 4 is a cross sectional view taken at a plane 4 of FIG. 3.

Referring now to the composite conveyor belt and belt-cleaning apparatus of FIGS. 1–4, there is shown an endless conveyor belt 10 having at any time an upper portion 10a for conveying a subject material between input and output stations (not shown). The ore or other particulate material is discharged onto and removed from the upper belt portion 10a in any conventional manner. The belt 10 also includes a lower portion 10b which moves toward the input station where it is then disposed in material-receiving position. The upper belt portion 10a moves over a plurality of belt supporting rollers 14a to 14d, while the lower belt portion 10b similarly progresses over plural rollers 15a to 15d. At least one of the rollers 14–15 is driven, e.g., the element 15d, while the remaining such elements operate in an idler mode.

For certain conveyor applications, e.g., when a mineral ore is transported thereby, small particulate matter may not be fully removed from belt 10a at the delivery station and adheres to belt 10 on its return travel, as by mechanical entrapment, surface adhesion or the like. It is often desirable to remove these retained particles to avoid undue accumulation thereof; to prevent random dislodgement of the particles to the immediate environment along the return travel of the belt; and/or to efficiently recover the particles should they comprise a valuable commodity.

To this end, belt-cleaning apparatus 20 is disposed contiguous and transverse to the return belt portion 10b at a belt-cleaning station. The cleaning apparatus 20 includes nested, annularly spaced hollow cylinder or cylinder-like elements 21 and 24 (FIG. 4) which communicate via an axial slot 25 in inner conduit 24. The annular chamber is designated by the numeral 21a. The outer conduit 21 has an opening which includes expanded flange portions 22 in proximity to belt 10b, and the inner tube 24 which is connected by a terminal duct member 30 to pressure reducing or suction apparatus (not shown) for producing reduced pressure or suction in the interior of conduit 24. The suction is thereby coupled via slot 25 to the annular space 21a between tubes 21 and 24, and between outwardly extending conduit flanges 22 and belt portion 10b.

The suction may be effected in any manner well known to those skilled in the art, as by including an axial or centrifugal air drawing fan within or coupled to the duct 30. The output discharge from the duct 30 may be connected to a waste chamber or may be collected for recovery if the particulate matter is of sufficient value.

A plurality of air stream producing nozzles 26 is disposed axially along the periphery of the inner conduit 24, and is supplied with compressed air from a source 33 thereof via a tube 28 secured within the tube 24.

In accordance with one aspect of our invention, the belt 10b is distended or flexed by roller 15b mounted on an adjustably positioned frame 17 at the cleaning station. This structure provides the dual benefits of (1) loosening the adhesion between the particles and belt by flexing the belt at the region of air impingement, and (2) bringing the belt portion 10b closer to the opening of outer conduit 21 to enhance the pulling action on the retained particles by suction applied at the region of particle dislodgement.

As the belt 10b moves over the nozzles 26 about the periphery of the roller 15b, the exiting air streams from nozzles 26 forcefully impinge thereon, thereby dislodging any particulate matter retained by the belt. The freed particles are then drawn by suction beneath the bolt portion 10b downward into the annular chamber between cylinders 21 and 24, into the interior of conduit 24 via slot 25, and axially within and through conduit 24 into the duct 30 for end collection. The expanded flange portions 22 of conduit 21 assure that substantially all dislodged matter will flow to duct 30 for collection irrespective of the angle of its initial travel vis-a-vis the belt 10b and the belt-cleaning apparatus 20.

The above described method and apparatus have thus been shown by the above to remove matter retained by the conveyor belt 10 beyond a delivery station therefor in an efficient manner, at a single, fixed, belt-cleaning station. Further, the arrangement employs a particle dislodging physical mechanism compatible with substantially all conveyance applications.

In summary, the conveyor belt-cleaning apparatus provided by the invention comprises a conveyor means including an endless belt consisting of a material delivery portion and a return belt portion which generally has particulate matter retained thereon. The improved belt-cleaning assembly is generally located below the return belt portion and comprises a first conduit located adjacent and transversely of the return belt portion, the conduit having an elongated opening running transverse and in proximate relation to the surface of the return belt portion. Included in the assembly is a second conduit located within the first conduit such as to define an annular chamber therebetween. A plurality of fluid nozzles is disposed along the outer surface of the second conduit so as to be arranged transversely to the surface of the return belt. The fluid nozzles are fed by fluid-conducting means coupled to the nozzles, the fluid generally being high pressure air. Aperture means are provided in the second conduit for communicating with the annular chamber, such that when suction is applied to the second conduit, it results in a corresponding suction in the annular chamber by virtue of the communicating apertures. Thus, as high pressure fluid is directed to the surface of the return belt to dislodge particulate matter therefrom, the dislodged matter is withdrawn by suction into the annular chamber and then through the communicating apertures for removal through the second conduit.

The method of the invention resides in directing a fluid stream across the width of the conveyor belt to dislodge any retained particulate matter therefrom, providing a zone of suction adjacent the fluid stream and across the width of the conveyor belt in proximate relation to the surface of the conveyor belt, and then maintaining the suction while directing the fluid stream against the surface of the conveyor belt, such that as the particulate matter is dislodged from the belt, it is withdrawn by suction away from the surface of the belt.

The method and apparatus presented in detail herein are merely descriptive of the principles of the present invention. Numerous modifications and adaptations thereof will be readily apparent to those skilled in the art without departing from the spirit and scope of the present invention.

What is claimed is:

1. The combination in an apparatus for cleaning a conveyor belt having particulate matter retained thereon which comprises means for directing a fluid stream across the width of the conveyor belt to dislodge said retained matter, first conduit means disposed transverse to the conveyor belt and in proximate relation thereto, said first conduit means including an elongated open portion disposed adjacent and transverse to said conveyor belt and also including a second conduit means disposed within said first conduit means such as to define an annular chamber therebetween, said second conduit means including aperture means for communicating via suction with said annular chamber, and means for producing a suction within said second conduit means for collecting matter dislodged by said fluid directing means via said elongated opening and collected in said annular chamber.

2. The combination as in claim 1 further comprising means for extending the conveyor belt in proximate relation to the opening of said first conduit means.

3. The combination as in claim 1 further comprising a conveyor belt and apparatus for moving said conveyor belt.

4. The combination as in claim 1 wherein said fluid directing means comprises a source of compressed air, plural nozzles oriented toward and across the width of said conveyor belt, and additional means coupling said air source and said nozzles.

5. The combination as in claim 1 wherein said first conduit means further includes at the opening thereof outwardly extending flange portions.

6. In a conveyor belt-cleaning apparatus comprising conveyor means including an endless conveyor belt consisting of a material delivery belt portion and a return belt portion with particulate matter retained thereon, an improved belt-cleaning assembly located below said return belt portion comprising a first conduit located adjacent and transversely of said return belt portion, said conduit having an elongated opening running transverse and in proximate relation to the surface of said return belt portion, a second conduit located within said first conduit such as to define an annular chamber therebetween, a plurality of fluid nozzles disposed along the outer surface of said second conduit and transversely to the surface of said return belt portion, fluid-conducting means coupled to said nozzles for feeding high pressure fluid thereto, aperture means in said second conduit communicating with said annular chamber, and suction means coupled to said second conduit for producing suction therein and in said annular chamber via said communicating apertures, such that as high pressure fluid is directed to the surface of said return belt to dislodge particulate matter therefrom, said matter is withdrawn by suction into the annular chamber and then through the communicating apertures for removal through said second conduit.

7. The conveyor belt-cleaning apparatus of claim 6, wherein said first conduit includes outwardly extending flange portions at each side of the opening thereof.

* * * * *